May 10, 1949. C. VALLE 2,469,799
AUTOMATIC TRANSMISSION FOR MOTOR VEHICLES
Filed Sept. 29, 1948
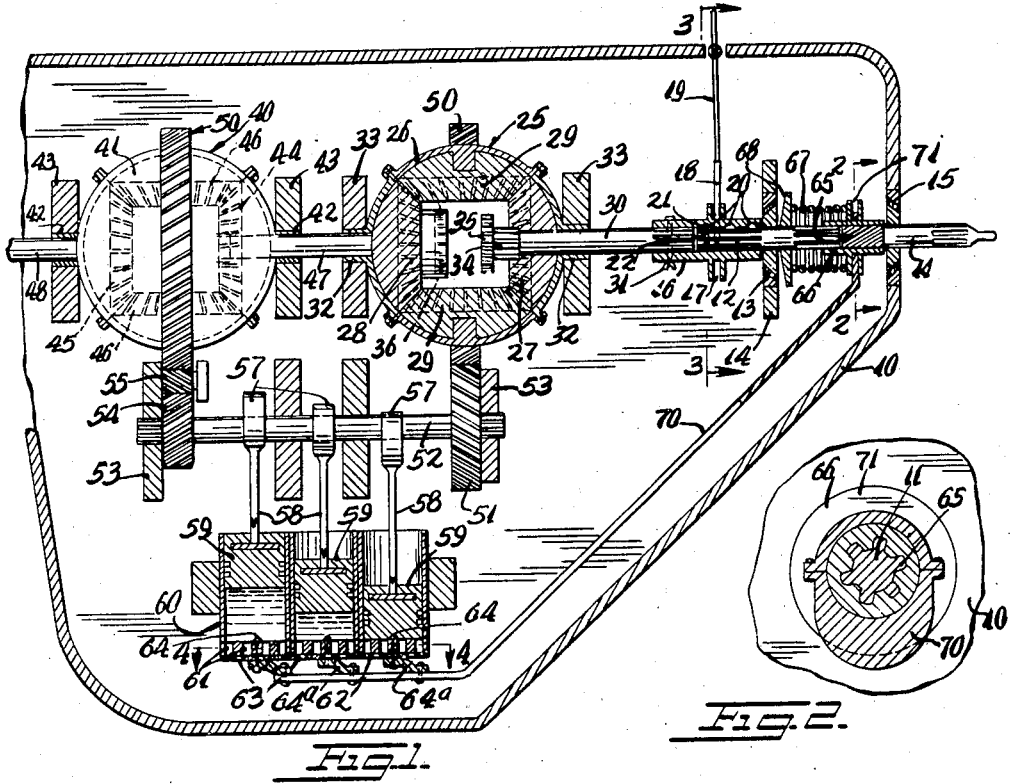
INVENTOR.
Charles Valle
BY
ATTORNEY Patented May 10, 1949

2,469,799

UNITED STATES PATENT OFFICE 2,469,799

AUTOMATIC TRANSMISSION FOR MOTOR VEHICLES

Charles Valle, Caracas, Venezuela

Application September 29, 1948, Serial No. 51,697

8 Claims. (Cl. 74—778)

1

This invention relates to new and useful improvements in a transmission.

More particularly, the invention proposes a new and improved transmission in which a differential or differentials are used in a way so that automatically the ratio of transmission is varied in proportion to the load. The arrangement will automatically step-up the mechanical ratio of transmission when the load is increased on the motor and it will automatically step-it down when the load goes back to normal. The transmission is particularly useful in automobiles, wherein the load upon the motor is varying, as for example, when the vehicle is first started, or when it is speeded up, or brought to a stop. The automatic transmission also works automatically on hills and on different kinds of roads that vary its load.

Another object of the invention proposes an arrangement by which the transmission may be placed into neutral position, or may be placed in a position for forward motion of the vehicle, or for reverse motion.

Still further the invention proposes a transmission as mentioned which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal vertical sectional view of a transmission constructed in accordance with this invention.

Fig. 2 is a fragmentary vertical sectional view taken on the line 2—2 of Fig. 1.

Fig. 3 is a fragmentary vertical sectional view taken on the line 3—3 of Fig. 1.

Fig. 4 is a fragmentary horizontal sectional view taken on the line 4—4 of Fig. 1.

The transmission, according to this invention, includes a main casing 10 for a lubricating fluid. A drive shaft 11 is rotatively mounted through one end of the main casing 10. This drive shaft 11 is intended to be connected with the clutch of a motor vehicle or with any similar device connected with the motor. A stud shaft 12 is rotatively mounted within the main casing 10 and has its front end in axial end alignment with the said shaft 11. The stud shaft 12 is rotatively supported by a suitable thrust bearing

2

13 which is mounted upon a web or other standard 14 connected with the casing 10. The drive shaft 11 is rotatively supported by a thrust bearing 15 which is supported on the end wall of the casing 10.

A shift collar 16 is slidably non-rotatively mounted on the rear end of the stud shaft 12. This shift collar 16 has a groove 17 which is engaged by a forked end 18 of a shift lever 19 which extends out from the top of the casing 10. The rear end of the stud shaft 12 is fluted and the shift collar 16 has complementary flutes by which it is slidably but non-rotatively mounted on the stud shaft. The collar 16 is formed with three recesses 20 cooperative with a steel ball 21 urged outwards by a spring 22 mounted within an opening in the stud shaft 12. The steel ball 21 is capable of holding the shift collar 16 in any one of three positions defined by the three recesses 20. As will hereinafter be seen, the central recess 20 represents a neutral position of the transmission. The front recess 20 represents the forward drive, and the rear recess 20 represents reverse.

A first differential unit 25 having a unitary casing 26 is rotatively mounted within the main casing 10 and axially aligned with said shift collar 16 and includes a pair of opposed front and rear gears 27 and 28 respectively, mounted coaxially in said unit casing 26 and meshing a pair of side gears 29 rotatively mounted on and within the unitary casing 26. The differential unit 25 is connected in certain ways with the shift collar 16. More particularly, the shift shaft 30 is fixedly connected coaxially with the shift collar 16 by having its front end fluted and engaging corresponding flutes in the rear end of the shift collar 16 and by being fixed into position with a cotter pin 31. The shift shaft 30 extends coaxially into the front end of the differential unit 25.

The unitary casing 26 of the differential unit 25 is formed with a pair of coaxial tubular portions 32 which are rotatively supported in standards 33 mounted on or connected with the main casing 10. The shift shaft 30 extends through the front tubular portion 32 and extends through the front gear 27 of the differential unit 25. The inner end of the shift shaft 30 is provided with coupling means for connecting it with the front gear 27 in a front position of the shift shaft 30, and with the rear gear 28, in which position of the shift shaft 30 is disconnected from the gears 27 and 28, the mid-way position of the shift shaft 30. This coupling means on the shift shaft 30 includes a fluted portion 34 which in a forward position of the shift shaft 30 engages a complementary fluted socket in the gear 27. The coupling means also includes a clutch 35 which in a rearwards position of the shift shaft 30 engages a complementary recess 36 formed in the hub of the rear gear 28.

A second differential unit 40 having a second unitary casing 41 is coaxially mounted rotatively within said main casing 10. The unitary casing 40 is provided with tubular portions 42 which rotatively engage through standards 43 mounted upon or connected with the main casing 10. The second differential unit 40 is axially aligned with the first differential unit 25. The second unit also includes a pair of opposed front and rear gears 44 and 45 respectively, rotatively mounted co-axially within the unitary casing 41. These gears 44 and 45 mesh with opposed side gears 46 which are rotatively mounted on and within the second unitary casing 41.

A connecting shaft 47 connects the gear 28 of the first differential unit 25 with the front gear 44 of the second differential unit 40. The connecting shaft 47 rotatively extends through the tubular portions 32 and 42 of the casings of the said differentials. A driven shaft 48 connects with the rear gear of the second differential unit 40.

Ring gears 50 are mounted on and about the unitary casings 26 and 41. These ring gears 50 are connected together by a train of gears which includes a gear 51 meshing with the ring gear 50 of the first differential unit 25 and mounted upon a shaft 52 which is rotatively supported in standards 53 mounted within the casing 10. The shaft 52 is provided with a gear 54 which meshes with an idler gear 55 which in turn meshes with the ring gear 50 of the second differential unit 40. The ring gears 50 and the gears of the train are of herring bone design.

The gear train which connects the ring gear 50 is associated with means for placing various loads thereon for holding the unitary casings 26 and 41 of the differential units 25 and 40 to various degrees, for controlling their speeds of rotation. This means includes several eccentrics 57 on the shaft 52 and controlling connecting rods 58 which in turn are connected with pistons 59. These pistons work in cylinders 60 which are fixedly mounted within the casing 10. The cylinders 60 have open top ends into which the connecting rods 58 extend. The bottom ends of the cylinders 60 are associated with control valves for controlling the entrance and exit of the lubricating fluid from the main casing 10 into the cylinders 60. Each valve is in the nature of perforations 61 formed in the bottom walls of the cylinders 60 and controlled by rotary valves 62. The rotary valves 62 have corresponding openings 63 which may align with the openings 61 or may be disaligned to various degrees. The valves 62 are rotatively supported on the bottom walls by pins 64. A radial arm 64a projects from each rotary valve 62 and connects with a connecting rod 70.

The means for placing various loads upon the train gears 51, 54 and 55 is itself controlled by an automatic means which is arranged to detect normal transmission loads and over or under loads. This detector means will gradually control the liquid fluid entering and leaving the cylinders 60 as the pistons 59 are reciprocated. This detector or controlling means including a helical thread 65 formed upon the inner end of the drive shaft 11 and meshing with a complementary thread formed upon a collar 66 engaged upon the inner end of the drive shaft 11. A spring 67 acts against the collar 66 for normally resiliently urging it forwards. This spring is coaxially mounted about the collar 66 and engages against a flange 68 fixedly mounted on the stud shaft 12. The spring 67 and the lead of the helix of the threads 65 are so designed that during normal operation of the transmission, that is, when it is transmitting its normal load, the valves 62 will be closed. Therefore there will be maximum resistance upon the gear 51, 54 and 55. The ring gears 50 will therefore be firmly held so that the unitary casings 26 and 41 are stationary, and the differential units are transmitting at maximum speed.

A connecting rod 70 has its front end connected with a groove 71 formed in the collar 66. The rear end of the connecting rod 70 connects with said rotary valves 62 for operating said valves.

The device functions as follows:

When there is more than a normal load for the transmission system, as will happen when the vehicle equipped with the transmission system is started, or accelerated, the helical threads 65 will force the collar 66 rearwards. The connecting rod 70 will be correspondingly moved, and will move the rotary valves 62 to a partially opened position or a fully opened position, depending merely upon the load. The collar 66 will move its maximum for maximum loads and intermediate distances for intermediate loads. The valves 62 will be operated accordingly. It will readily be seen that as the valves 62 open, or partially open, the pistons 59 will be freed, or partially freed, so that they reciprocate. They will reciprocate at various speeds depending merely upon the position of the valves 62. The load upon the gear train 51, 54 and 55 will therefore be varied, and as the valves 62 open, the gear train is freed and the ring gears 50 will become free to rotate. The unitary casings 26 and 41 therefore turn, and the speed of transmission by the differentials 25 and 40 will be reduced. Consequently when the speed of the transmission is reduced the force of transmission is increased. This increase in the force of transmission will take care of the extra load. As the extra load disappears and the normal load appears, the transmission will automatically function to transmit the normal load as already stated.

The shift lever 19 is illustrated in position in which the fluted portion 34 of the shift shaft 30 is engaged with the complementary fluted portion of the gear 27 of the first differential unit 25. In this position of the parts the transmission is in condition for forward turning. The shift lever 19 may be moved to move the shift shaft 30 so as to place the transmission into neutral position, the position in which the fluted portion 34 and the gear 35 is completely free, or it may be removed to place the shift in reverse position, in which the clutch 35 is connected with the complementary opening 36 and the gear 28.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission.

2. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit, having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, the unitary casing of the first differential unit having coaxial tubular portions through which the shift shaft and connecting shaft rotatively pass.

3. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, the unitary casing of the second differential having coaxially tubular portions through which said connecting shaft and the driven shaft rotatively pass.

4. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, said gear train including a shaft rotatively mounted, a gear fixed on said shaft and meshing with the ring gear of the first unitary casing, another gear on said latter named shaft, an idler meshing with said last named gear and said idler meshing with the ring gear of said second named unit.

5. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, said gear train including a shaft, and said means for placing various loads upon said gear train including eccentrics on said last named shaft, connecting rods engaging said eccentrics to reciprocate upon rotation of said last named shaft, pistons connected with said connecting rods, cylinders for said pistons, said cylinders being in the lubricating liquid of said main casing, and valve means for controlling the rate at which the lubricating fluid may enter and leave said cylinders as said pistons reciprocate.

6. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differentiaal unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unit casings for said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, said gear train including a shaft, and said means for placing various loads upon said gear train including eccentrics on said last named shaft, connecting rods engaging said eccentrics to reciprocate upon rotation of said last named shaft, pistons connected with said connecting rods, cylinders for said pistons, said cylinders being in the lubricating liquid of said main casing, and valve means for controlling the rate at which the lubricating fluid may enter and leave said cylinders as said pistons reciprocate, said valve means being in the nature of rotary valves having openings alignable with complementary openings formed in the bottom ends of said cylinders.

7. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, said gear train including a shaft, and said means for placing various loads upon said gear train including eccentrics on said last named shaft, connecting rods engaging said eccentrics to reciprocate upon rotation of said last named shaft, pistons connected with said connecting rods, cylinders for said pistons, said cylinders being in the lubricating liquid of said main casing, and valve means for controlling the rate at which the lubricating fluid may enter and leave said cylinders as said pistons reciprocate, said means for controlling said means for placing various loads upon the gear train including a helical threaded portion upon the drive shaft, a collar engaged upon the inner end of the drive shaft and having complementary threads engaging said helical thread, resilient means for urging said collar forwards and connecting rod connecting said collar and said valve for opening the valve upon loads above the normal load on the transmission.

8. A transmission, comprising a main casing for a lubricating fluid, a drive shaft rotatively mounted through one end of said main casing, a stud shaft rotatively mounted within said main casing and having its front end in axial end alignment with said drive shaft, a shift collar slidably and non-rotatively mounted on the rear end of said stud shaft, a first differential unit having a unitary casing axially rotatively mounted within said main casing and axially aligned with said shift collar and including a pair of opposed front and rear gears rotatively mounted coaxially in said unitary casing and meshing with a pair of opposed side gears rotatively mounted on said unitary casing, a shift shaft fixedly connected coaxially with said shift collar and extending coaxially into the front end of said differential unit and having its rear end provided with coupling means for connecting with said front gear in a front position of said shift shaft and with said rear gear in a rear position of said shift shaft and being free from gear contact in a midway position of said shift shaft, a second differential unit having a second unitary casing axially rotatively mounted within said main casing and axially aligned with said first differential unit and including a pair of opposed front and rear gears rotatively mounted coaxially in said second unitary casing and meshing with a pair of opposed side gears rotatively mounted on said second unitary casing, a connecting shaft connecting the rear gear of said first differential unit with the front gear of said second differential unit, a driven shaft connected with the rear gear of said second differential unit, ring gears mounted upon the unitary casings of said differential units, a gear train connecting said ring gears for the ring gears to rotate in opposite directions, means for placing various loads upon said gear train for holding the unitary casings of said differential units to various degrees for controlling their speeds of rotation, and means for controlling said means for placing various loads or for freeing the unitary casings of said differentials during normal transmission of loads and gradually holding said unitary casings to graduated degrees during increased loads on said transmission, said gear train including a shaft, and said means for placing various loads upon said gear train including eccentrics on said last named shaft, connecting rods engaging said eccentrics to reciprocate upon rotation of said last named shaft, pistons connected with said connecting rods, cylinders for said pistons, said cylinders being in the lubricating liquid of said main casing, and valve means for controlling the rate at which the lubricating fluid may enter and leave said cylinders as said pistons reciprocate, said means for controlling said means for placing various loads upon the gear train including a helical threaded portion upon the drive shaft, a collar engaged upon the inner end of the drive shaft and having complementary threads engaging said helical thread, resilient means for urging said collar forwards, and connecting rod connecting said collar and said valve for opening the valve upon loads above the normal load on the transmission, said resilient means comprising a spring coaxially mounted about said collar and engaging a flange fixedly mounted on said stud shaft.

CHARLES VALLE.

No references cited.